March 6, 1928.
G. D. PATE
1,661,497
BATTERY TERMINAL
Filed April 25, 1925
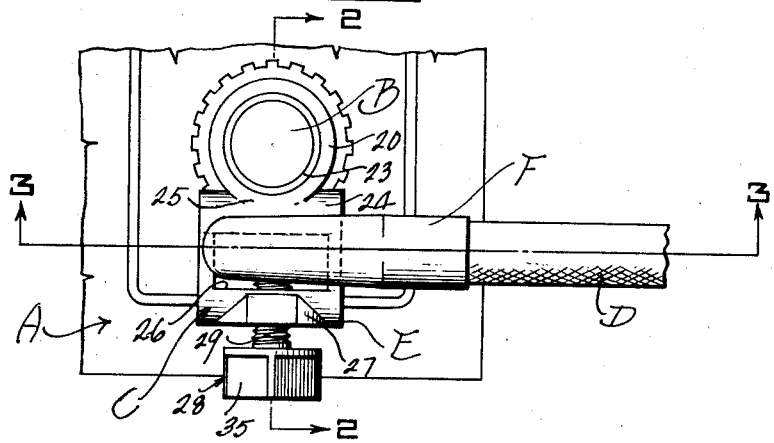
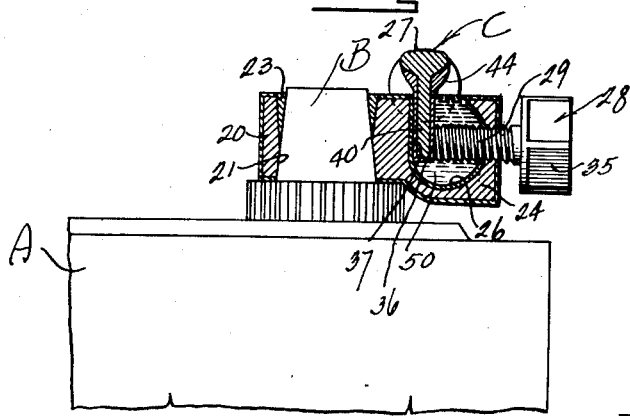
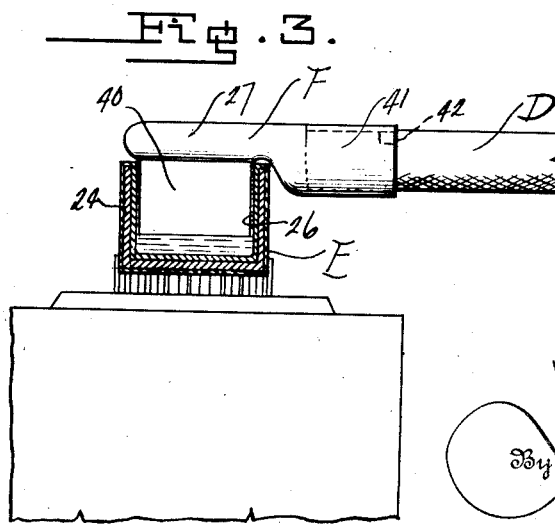
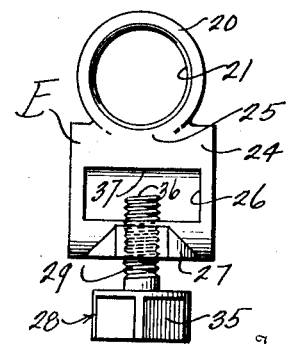
Inventor
George D. Pate
By Lancaster and A. Levine
Attorneys Patented Mar. 6, 1928.

1,661,497

UNITED STATES PATENT OFFICE.

GEORGE DEWEY PATE, OF AKRON, OHIO, ASSIGNOR OF THIRTY FOUR-HUNDREDTHS TO DORA NEAL, OF KENMORE, OHIO, AND ONE-FOURTH TO SIMON MYERS, OF AKRON, OHIO.

BATTERY TERMINAL.

Application filed April 25, 1925. Serial No. 25,751.

This invention relates to improvements in storage battery terminals or connections.

The primary object of this invention is the provision of a battery connection, embodying an improved and novel assemblage of parts which will do away with the drawbacks incident to the use of conventional connections.

A further object of this invention is the provision of a two part battery connection, embodying a part adapted for permanent attachment to the battery post and a wire connecting part; the parts embodying a novel arrangement to effect their quick attachment or detachment; this arrangement being protected in novel manner against the deteriorating influences of the battery acid.

A further object of this invention is the provision of a durable battery connection, which is relatively simple, and which may be economically manufactured for use as an accessory upon battery terminals.

Other objects and advantages of this invention will be apparent during the course of the following detailed description.

In the accompanying drawing, forming a part of this specification, and wherein similar reference characters designate corresponding parts throughout the several views, Figure 1 is a plan view of the improved terminal piece or connection, showing the parts as they are assembled upon a storage battery.

Figures 2 and 3 are sectional views taken substantially on their respective lines in Figure 1 of the drawing.

Figure 4 is a plan view of the battery posts connecting part of the improved terminal construction.

In the drawing, wherein for the purpose of illustration is shown only a preferred embodiment of the invention, the letter A may generally designate a storage battery of any approved type, which includes the conventional battery plate posts, B, and upon which the improved connector C is mounted for detachable connection of the wire D to the post B. The improved connector preferably comprises the post attached portion E and the wire attached portion F.

The battery post B is preferably of the outwardly tapering type.

Referring to the battery post attaching member E of the improved connection C, the same preferably is formed of a body or frame work of brass alloy, or analogous material, provided with a protecting coating of substantially pure lead, to resist the corrosive effect of the acid from the storage battery. As to particular shape, the member E preferably comprises the substantially ring shaped portion 20, providing a way 21 therein adapted to receive the terminal post B. The way 21 is so formed that when the post B is disposed therein, a slight annular space is provided between the upper end of the post B and the inner periphery of the ring shaped portion 20, for receiving solder 23, as illustrated in Figure 2, by means of which to permanently attach the member E to the battery post. Furthermore, the improved member E includes the substantially polygonal shaped receptacle portion 24, integrally joined at 25 at the outer circumference of the attaching ring 20. This receptacle portion 24 is preferably wider, or as wide, as the attaching ring 20, and the same is provided with a pocket 26 opening downwardly vertically therein, and is adapted to receive a lug portion 40 of the wire connecting piece F to be subsequently described. This pocket 26 is of special formation, being preferably polygonal, and of greater length than width; the width being in a line radial of the ring 20. At the opposite side 27 from the post attaching ring 20, the receptacle portion 24 preferably supports a large set screw 28, which comprises a lead coated brass screw threaded shank 29 adjustable in a screw threaded opening 30 in this side 27 of the receptacle 24, and a lead polygonal shaped head 35, very large, so as to permit its facile grasping by wrench, pliers, or the like. The set screw 28 is relatively large, and it is adjustably in line radial of the ring 20; it being the object of providing the same to clamp the lug 40 of the wire connecting piece F between the end edge 36 of the set screw and the facing in side wall 37 of the pocket 26.

Referring to the wire attaching piece F, the same is of somewhat novel construction, including a solid head piece 27, having an aligning sleeve like socket portion 41 thereon, provided with the socket opening 42 adapted to receive an end of the cable or wire D, as is illustrated in Figure 3. This sleeve like socket 41 is offset slightly below the head 27, and at the same side as the lug 40. The solid head portion 27 preferably is provided with the lug 40, which is polygonal in formation, and of less width than the head 27, and preferably lead coated, as at 44 in Figure 2 of the drawing, to render the same corrosive resisting, and so that the main body of the member F may be made of durable materials, such as brass alloy and the like. The lug 40 is preferably of the same length as the pocket 26, although less in width than the pocket 26, and the relation in which the same sets in the pocket is well illustrated in Figures 2 and 3 of the drawings. The pocket 26 is really adapted to receive grease, petroleum jelly, or other viscid material 50, and into this mass the lug 40 is inserted and clamped in the position above mentioned by means of the set screw 28.

From the foregoing description of this invention it is apparent that a novel type of battery connector is provided, which includes a novel assemblage of parts. The connector is insured against break down due to corrosive effect of battery acid, primarily because the portion E has a permanent soldered connection with the post B, and because the detachable connection furnished by the lug 40 in the pocket 26, is protected against acid because of the presence of the grease or material 50, which is held intact in the receptacle, as can readily be understood. The part F is quickly detachable from the part E, merely by turn of the set screw 28, as can readily be understood, and the operation of this set screw is very easily accomplished, due to the accessible position of the same, and the large size in which the same may be constructed. The fact that the parts of the connector are in the main formed of durable metal, such as brass alloy, and protected from acid corrosion by means of merely coating, is believed to be a novel feature.

In this connection it is also to be noted that the detachable connection takes place at a point laterally of the joint formed by the post B and the body A, and is therefore in a position where the same is less susceptible to the deteriorating influences of the battery acids.

Various changes in the shape, size, and arrangement of parts may be made to the form of the invention herein shown and described, without departing from the spirit of the invention or the scope of the claims.

I claim:

1. As an article of manufacture a battery connector comprising a post attaching portion formed of a hard metal body portion having a vertical pocket therein open only at the top thereof, said body portion having an acid resisting metal coating extending into and about the pocket thereof, a cable connecting member including a terminal formed of a body portion coated with an acid resisting metal, said terminal adapted to be extended into the pocket of the post attaching portion, and acid resisting clamping means adjustably carried by the post attaching portion adjustable into the pocket for the purpose of releasably clamping the terminal therein, said pocket being adapted to receive a plastic acid resisting substance for sealing the connection of the terminal in the pocket of the post attaching portion.

2. As an article of manufacture a battery connector comprising a post attaching portion having a pocket therein open at the top thereof, said pocket being transversely of irregular cross section, a cable connecting terminal including a lug portion of irregular cross section adapted to fit in said pocket in a non-rotary position therein, and clamping means adjustably carried by the post attaching portion for releasably clamping the terminal lug in said pocket, said terminal lug when so clamped in the pocket leaving room in said pocket for an acid resisting plastic sealing substance.

GEORGE DEWEY PATE.